Patented July 8, 1924.

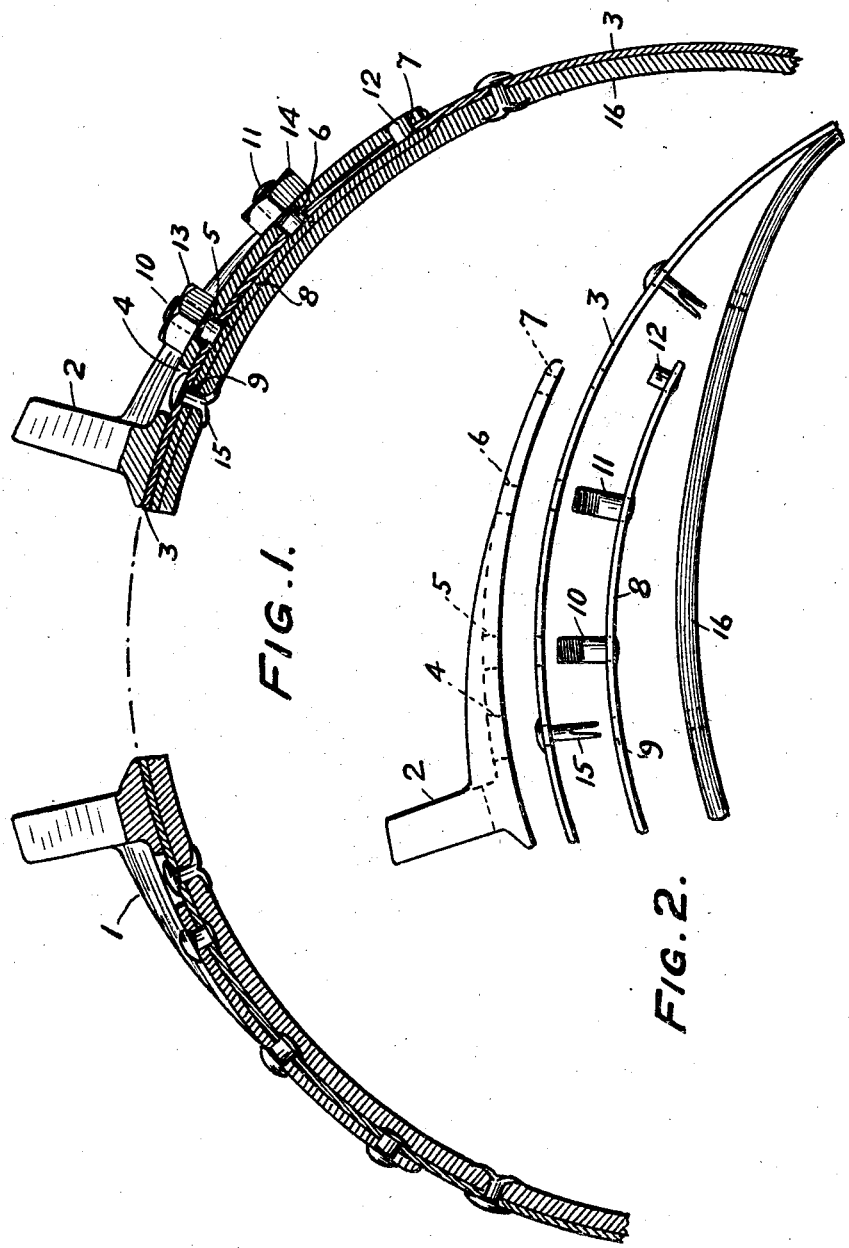

1,500,396

UNITED STATES PATENT OFFICE.

ARTHUR J. KIRN, OF PHILADELPHIA, PENNSYLVANIA, ASSIGNOR OF ONE-HALF TO CLARA M. GRUBER, OF PHILADELPHIA, PENNSYLVANIA.

BRAKE AND TRANSMISSION BAND.

Application filed May 21, 1923. Serial No. 640,362.

*To all whom it may concern:*

Be it known that I, ARTHUR J. KIRN, a citizen of the United States, residing at Philadelphia, in the county of Philadelphia and State of Pennsylvania, have invented a new and useful Improvement in Brake and Transmission Bands, of which the following is a specification.

The principal objects of the present invention are to facilitate the relining of brake and transmission bands which are duplicates and are provisions of cars or automobiles of the type marketed by the Ford Company and known as Ford cars; to provide bands of the character referred to which can be dis-assembled and removed, and inserted and re-assembled without taking down or taking out the transmission casing; and to provide bands of the character mentioned which can be applied and removed through the space provided by the removal of the cover plate at the top of the transmission casing and without otherwise disturbing the latter.

To these and other ends hereinafter stated the invention comprises the combination with a band of the character referred to and for the purposes there indicated, of a detachable ear member adapted to overlie one end of the band, a detachable retaining plate adapted to underlie the end of the band, and fastening devices carried by the plate and adapted to pass through openings provided in the band and in the ear member in order to permit the ear member and plate and fastening devices to be disconnected from and connected with the band.

The invention further comprises the improvements to be presently described and finally claimed.

In the description reference will be made to the accompanying drawings forming part hereof and in which Figure 1 is a sectional elevation of a band with the center part removed illustrating features of the invention and showing the parts in assembled position, and Fig. 2 is an elevational view of one end of the band showing the parts embodying features of the invention in disassembled position.

In the drawings the end 1 is of usual construction. The ear member 2 is detachable from the band 3, and it is shown as provided with four openings 4, 5, 6 and 7, although the number of openings may be increased or diminished. 8 is a retaining plate and it is shown as provided with one opening 9 and with two bolts 10 and 11, and with a stud 12 which are connected with it and are removed with it. The parts 10, 11 and 12 pass through openings provided in the end 3 of the band and the threaded bolts or stems 10 and 11 project through the openings 5 and 6, and the stud 12 enters the opening 7. 13 and 14 are detachable nuts. 15 is a so-called rivet which is arranged through the opening 4 and serves to secure the lining 16 of the band.

In order to renew the lining 16, the band must be taken out of the transmission casing. In the case of the band embodying the present invention this is accomplished by taking off the small cover provided at the top of the transmission casing thereby obtaining access to the ends of the bands. The nuts 13 and 14 and the band rivet 15 are detached, the ear element 2 is detached and the retaining plate 8 is detached carrying with it the bolts and the stud, thus the end of the band is freed from all attachments and by pulling on the end 1 of the band, the band can be withdrawn through the opening in the transmission casing to which reference has been made, and during this operation the end 1 of the band is first pulled or passed through the opening. Of course when the band is thus dismounted the lining can be readily renewed. After that the free end of the band can be first inserted through the opening in the transmission casing to which reference has been made and the band slipped into place, and during this operation the end 1 may be pushed. After the band is in place the ear member and retaining plate and fastening devices are connected with the band. The retaining plate is inserted between the new lining and the end of the band, and the end of the band is secured by a rivet 15. It may be remarked that in the transmission there is very little space for the end 3 to pass through and it is therefore important and necessary not only that the ear member and plate be removed but also that the fastening devices be removed.

It will be obvious to those skilled in the art to which the invention relates that modifications may be made in details of construction and arrangement without departing from the spirit of the invention which

I claim:

1. A brake or transmission band having openings provided at or near one of its ends, a lining for the band, a retaining plate detachable from the band and adapted to be arranged between the lining and the band, an ear member detachable from and adapted to overlie the band and plate, and fastening devices adapted to co-operate with the openings in the band and removable from the band.

2. In a band of the character described having openings at one of its ends the combination of an ear member having openings and adapted to overlie the end of the band, a retaining plate detachable from the band and adapted to underlie its end, and fastening devices carried by and removable with the plate and adapted to connect and disconnect the plate, band and ear member.

3. The combination with a band of the type described of a detachable ear member, a detachable retaining plate, and bolts and a stud carried by and removable with the plate and adapted to connect and disconnect the member, plate and fastening devices in respect to the band.

ARTHUR J. KIRN.